United States Patent
Pehlke

(10) Patent No.: US 11,336,325 B2
(45) Date of Patent: *May 17, 2022

(54) METHODS AND APPARATUS FOR ENHANCED TRANSCEIVER PERFORMANCE USING DIFFERENTIAL FILTERING

(71) Applicant: SKYWORKS SOLUTIONS, INC., Irvine, CA (US)

(72) Inventor: David Richard Pehlke, Westlake Village, CA (US)

(73) Assignee: SKYWORKS SOLUTIONS, INC., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/201,237

(22) Filed: Mar. 15, 2021

(65) Prior Publication Data

US 2021/0203376 A1 Jul. 1, 2021

Related U.S. Application Data

(63) Continuation of application No. 16/929,205, filed on Jul. 15, 2020, now Pat. No. 10,985,796.

(60) Provisional application No. 62/878,825, filed on Jul. 26, 2019.

(51) Int. Cl.
*H04B 1/38* (2015.01)
*H04B 1/50* (2006.01)

(52) U.S. Cl.
CPC .................... *H04B 1/50* (2013.01)

(58) Field of Classification Search
CPC .............. H04B 1/04; H04B 2001/0408; H04B 1/0475; H04B 1/10; H04B 1/1081; H04B 1/16; H04B 1/18; H04B 1/40; H04B 1/50
See application file for complete search history.

(56) References Cited

U.S. PATENT DOCUMENTS

| | | | |
|---|---|---|---|
| 6,785,324 B1 | 8/2004 | Schultz et al. | |
| 10,985,796 B2* | 4/2021 | Pehlke ................. | H04B 1/50 |
| 2003/0092408 A1* | 5/2003 | Frank .................. | H04B 1/40 |
| | | | 455/130 |
| 2011/0267144 A1 | 11/2011 | Behera et al. | |
| 2011/0300885 A1* | 12/2011 | Darabi ................ | H04B 1/52 |
| | | | 455/500 |
| 2013/0242811 A1 | 9/2013 | Ando | |

(Continued)

*Primary Examiner* — Tuan Pham
(74) *Attorney, Agent, or Firm* — Lando & Anastasi, LLP

(57) ABSTRACT

Noise-cancellation techniques based on differential filtering, and front-end modules and wireless devices incorporating same. An example of a front-end module includes a transmit contact, a receive contact, and an antenna contact, a duplexer including a transmit filter connected in a transmit path between the transmit and antenna contacts, and a receive filter connected in a receive path between the antenna and receive contacts, the transmit filter having an input and the receive filter having an output, differential signal lines connected to one of the input of the transmit filter or the output of the receive filter, and configured to provide a differential transmit signal to the input of the transmit filter or provide a differential receive signal from the output of the receive filter, and a bandpass filter connected between the differential signal lines and configured to provide a frequency-specific short between the differential signal lines.

20 Claims, 6 Drawing Sheets

(56) References Cited

U.S. PATENT DOCUMENTS

2018/0269922 A1* 9/2018 Abiru .................. H03H 7/24
2021/0028813 A1 1/2021 Pehlke

* cited by examiner

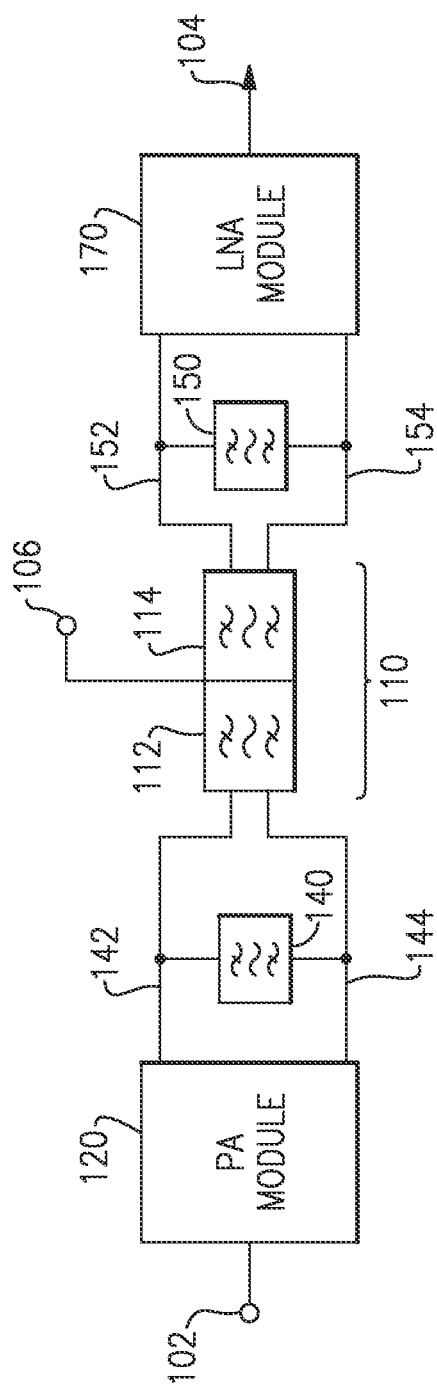

METHODS AND APPARATUS FOR ENHANCED TRANSCEIVER PERFORMANCE USING DIFFERENTIAL FILTERING

CROSS-REFERENCE TO RELATED APPLICATIONS

This application claims priority under 35 U.S.C. § 120 as a continuation of U.S. patent application Ser. No. 16/929,205 titled METHODS AND APPARATUS FOR ENHANCED TRANCEIVER PERFORMANCE USING DIFFERENTIAL FILTERING filed on Jul. 15, 2020, which claims the benefit under 35 U.S.C. § 119(e) of U.S. Provisional Patent Application No. 62/878,825 titled METHODS AND APPARATUS FOR ENHANCED TRANCEIVER PERFORMANCE USING DIFFERENTIAL FILTERING filed on Jul. 26, 2019, each of which being incorporated herein by reference in its entirety for all purposes.

BACKGROUND

Performance degradation in wireless front-end modules due to self-generated carrier signals, spurious emissions, and noise from external sources is a significant challenge in modern communications. Many wireless communications devices include multiple transmitter channels that interfere with each other. In addition, external nearby wireless devices create interference that may further cause performance degradation in a given front-end module. These interference issues drive much complexity due to stringent out-of-band isolation and attenuation requirements in the filter(s) used in the front-end module, which also impacts the insertion loss. This in turn, for the transmitter(s) causes increased DC power consumption and power capability challenges, and for the receiver(s) degrades the sensitivity, worsening the so-called "desense" behavior of the receiver for throughput and data rate.

In self-contained frequency division duplex (FDD) operation of a single band within a communications device, transmit carrier leakage in the frequencies of the transmit band that undesirably reaches the receiver channel can significantly degrade the receiver sensitivity as a function of that leakage power. The noise and sometimes spectral regrowth or Alternate Channel Rejection (ACLR) of the transmitter that extends to the receive frequencies in-band of the intended receiver channel also significantly degrades the noise floor, minimum detectable signal, and receiver sensitivity in the form of receiver desense (the difference in receiver sensitivity between the transmitter being in the ON state and the OFF state). Both these leakage issues are conventionally addressed through the brute force of designing higher and higher isolation between the transmit and receive paths of the filter(s) in the front-end module, which as noted above, causes increased complexity in the design and worsens the insertion loss.

SUMMARY OF THE INVENTION

It is desirable to cancel frequency-specific interference from known sources in a transceiver architecture, but no good (purely analog) cancellation solution exists today. Aspects and embodiments are directed to noise cancellation achieved by shorting together two differential signal lines, at certain frequencies, and feeding those differential signal lines into a differential filter with common mode rejection behavior.

According to one embodiment, a front-end module comprises a transmit contact, a receive contact, and an antenna contact, a duplexer including a first transmit filter connected in a transmit path between the transmit contact and the antenna contact, and a first receive filter connected in a receive path between the antenna contact and the receive contact, the first transmit filter having a differential input, a power amplifier module connected in the transmit path between the transmit contact and the first transmit filter, the power amplifier module being configured to supply a differential transmit output on first and second differential signal lines connected to the differential input of the first transmit filter, and a first bandpass filter connected between the first and second differential signal lines and configured to provide a first frequency-specific short between the first and second differential signal lines.

In one example, the first bandpass filter has a passband overlapping in frequency with a passband of the first receive filter.

In one example, the power amplifier includes a first power amplifier stage and a differential power amplifier stage, and the front end-module may further comprise a second transmit filter connected in the transmit path between the first power amplifier stage and the differential power amplifier stage, the second transmit filter being configured to convert a single-ended output from the first power amplifier stage into a differential input to the differential power amplifier stage, and the differential power amplifier stage being configured to supply the differential transmit output on the first and second differential signal lines. In one example, the second transmit filter is a surface acoustic wave filter. In another example, the first bandpass filter is a bulk acoustic wave (BAW) filter or a film bulk acoustic resonator (FBAR) filter.

The front-end module may further comprise a second receive filter connected in the receive path between the first receive filter and the receive contact, the first receive filter being configured to supply a differential receive output on third and fourth differential signal lines connected to a differential input of the second receive filter, and a second bandpass filter connected between the third and fourth differential signal lines and configured to provide a second frequency-specific short between the third and fourth differential signal lines. In one example, the second bandpass filter has a passband overlapping in frequency with a passband of the first transmit filter. The second bandpass filter may be a BAW or FBAR filter in certain examples.

The front-end module may further comprise a low noise amplifier module connected in the receive path between the second receive filter and the receive contact. In one example, the second receive filter is configured to convert the differential receive output to a single-ended input into the low noise amplifier module. In another example, the second receive filter is a surface acoustic wave filter.

According to another embodiment, a front-end module comprises a transmit contact, a receive contact, and an antenna contact, a duplexer including a first transmit filter connected in a transmit path between the transmit contact and the antenna contact, and a first receive filter connected in a receive path between the antenna contact and the receive contact, the first receive filter configured to provide a differential receive output on first and second differential signal lines, a second receive filter having a differential input connected the first and second differential signal lines, and a first bandpass filter connected between the first and second differential signal lines and configured to provide a first frequency-specific short between the first and second differential signal lines.

In one example, the first bandpass filter has a passband overlapping in frequency with a passband of the first transmit filter.

The front-end module may further comprise a low noise amplifier module connected in the receive path between the second receive filter and the receive contact. In one example, the second receive filter is configured to convert the differential receive output into a single-ended input into the low noise amplifier module. The second receive filter may be a surface acoustic wave filter, for example. In another example, the first bandpass filter may be a filter constructed using BAW or FBAR devices.

In one example, the first transmit filter has a differential input, and the front-end module further comprises a power amplifier module connected in the transmit path between the transmit contact and the first transmit filter, the power amplifier module being configured to supply a differential transmit output on third and south differential signal lines connected to the differential input of the first transmit filter, and a second bandpass filter connected between the third and fourth differential signal lines and configured to provide a second frequency-specific short between the third and fourth differential signal lines. The second bandpass filter may have a passband overlapping in frequency with a passband of the first receive filter. The second bandpass filter may be a bulk acoustic wave or film bulk acoustic resonator filter, for example. In one example, at least one of the first bandpass filter and the second bandpass filter includes at least one bulk acoustic wave device or at least one film bulk acoustic resonator device.

In one example, the power amplifier includes a first power amplifier stage and a differential power amplifier stage, and the front end-module further comprises a second transmit filter connected in the transmit path between the first power amplifier stage and the differential power amplifier stage, the second transmit filter being configured to convert a single-ended output from the first power amplifier stage into a differential input to the differential power amplifier stage, and the differential power amplifier stage being configured to supply the differential transmit output on the third and fourth differential signal lines. In one example, the second transmit filter is a surface acoustic wave filter.

In another example, the first transmit filter has a differential input, and the front-end module further comprises a second transmit filter connected in the transmit path between the transmit contact and the first transmit filter, the second transmit filter being configured to provide a differential transmit output on third and fourth differential signal lines connected to the differential input of the first transmit filter, and a second bandpass filter connected between the third and fourth differential signal lines and configured to provide a second frequency-specific short between the third and fourth differential signal lines. The second bandpass filter may have a passband overlapping in frequency with a passband of the first receive filter. In one example, the front-end module further comprises a power amplifier module connected in the transmit path between the transmit contact and the second transmit filter. In another example, the second transmit filter is configured to convert a single-ended output from the power amplifier module into the differential transmit output. The second transmit filter may be a surface acoustic wave filter, for example.

According to another embodiment, a front-end module comprises a transmit contact, a receive contact, and an antenna contact, a duplexer including a first transmit filter connected in a transmit path between the transmit contact and the antenna contact, and a first receive filter connected in a receive path between the antenna contact and the receive contact, the first transmit filter having a differential input, a power amplifier module connected in the transmit path between the transmit contact and the first transmit filter, the power amplifier module being configured to receive a single-ended transmit input and to supply a differential transmit output on first and second differential signal lines connected to the differential input of the first transmit filter, and a first bandpass filter connected between the first and second differential signal lines and configured to provide a first frequency-specific short between the first and second differential signal lines.

In one example, the front-end module further comprises a second transmit filter connected in the transmit path between the transmit contact and the power amplifier module.

The first bandpass filter may include at least one bulk acoustic wave device or at least one film bulk acoustic resonator device, for example.

In another example, the first receive filter is configured to provide a differential receive output on third and fourth differential signal lines, and the front-end module further comprises a second bandpass filter connected between the third and fourth differential signal lines and configured to provide a second frequency-specific short between the third and fourth differential signal lines. The front-end module may further comprise a low noise amplifier module connected in the receive path between the first receive filter and the receive contact, the low noise amplifier module being configured to convert the differential receive output from the first receive filter to a single-ended receive output. In one example, the front-end module further comprise a second receive filter connected in the receive path between the low noise amplifier module and the receive contact. The second bandpass filter may include at least one bulk acoustic wave device or at least one film bulk acoustic resonator device, for example.

According to aspects of the disclosure, a front-end module comprises a transmit contact, a receive contact, and an antenna contact, a duplexer including a first transmit filter connected in a transmit path between the transmit contact and the antenna contact, and a first receive filter connected in a receive path between the antenna contact and the receive contact, the first transmit filter having a differential input and the first receive filter having a differential output, first and second differential signal lines connected to one of the differential input of the first transmit filter or the differential output of the first receive filter, and configured to provide a first differential transmit signal to the differential input of the first transmit filter or provide a first differential receive signal from the differential output of the first receive filter, and a first bandpass filter connected between the first and second differential signal lines and configured to provide a first frequency-specific short between the first and second differential signal lines.

In some examples, the first bandpass filter has a passband overlapping in frequency with a passband of at least one of the first receive filter and the first transmit filter. In at least one example, the front-end module further comprises a second transmit filter coupled between the transmit contact and the first and second differential signal lines. In various examples, the second transmit filter is a surface acoustic wave filter. In some examples, the front-end module includes a second receive filter coupled between the receive contact and the first and second differential signal lines. In at least one example, the second receive filter is a surface acoustic wave filter.

In various examples, the first and second differential signal lines are connected between the transmit contact and the first transmit filter, the front-end module further comprising third and fourth differential signal lines connected between the first receive filter and the receive contact, and a second bandpass filter connected between the third and fourth differential signal lines and configured to provide a second frequency-specific short between the third and fourth differential signal lines. In some examples, the second bandpass filter has a passband overlapping in frequency with a passband of the first transmit filter. In at least one example, the front-end module includes a low noise amplifier module connected in the receive path between the second receive filter and the receive contact.

In various examples, the second receive filter is configured to convert the differential output to a single-ended input into the low noise amplifier module. In some examples, the second receive filter is a surface acoustic wave filter. In at least one example, the front-end module includes a power amplifier module connected in the transmit path between the transmit contact and the first transmit filter, the power amplifier module being configured to supply a differential transmit output on the first and second differential signal lines connected to the differential input of the first transmit filter.

In various examples, at least one of the first bandpass filter and the second bandpass filter includes at least one bulk acoustic wave device or at least one film bulk acoustic resonator device. In at least one example, the power amplifier includes a first power amplifier stage and a differential power amplifier stage, the front end-module further comprising a second transmit filter connected in the transmit path between the first power amplifier stage and the differential power amplifier stage, the second transmit filter being configured to convert a single-ended output from the first power amplifier stage into a differential input to the differential power amplifier stage, the differential power amplifier stage being configured to supply the differential transmit output on the first and second differential signal lines.

According to aspects of the disclosure, a method of operating a front-end module including a transmit contact, an antenna contact, a receive contact, a duplexer including a first transmit filter connected in a transmit path between the transmit contact and the antenna contact and a first receive filter connected in a receive path between the antenna contact and the receive contact, first and second differential signal lines connected to one of an input of the first transmit filter or an output of the first receive filter, and a first bandpass filter connected between the first and second differential signal lines is provided, the method comprising receiving, at the transmit contact, a transmit signal, providing, at the receive contact, a receive signal, communicating, by the first and second differential signal lines, the transmit signal from the transmit contact to the first transmit filter or the receive signal from the first receive filter to the first receive contact, and providing, by the first bandpass filter, a first frequency-specific short between the first and second differential signal lines to one of the transmit signal and the receive signal.

In at least one example, the front-end module further includes third and fourth differential signal lines coupled to the output of the first receive filter and a second bandpass filter connected between the third and fourth differential signal lines, the method further comprising providing, by the second bandpass filter, a second frequency-specific short between the third and fourth differential signal lines to the receive signal. In various examples, the front-end module further includes a second receive filter coupled between the receive contact and the third and fourth differential signal lines and a low noise amplifier module connected in the receive path between the second receive filter and the receive contact, the method further comprising converting, by the second receive filter, the output of the first receive filter to a single-ended input into the low noise amplifier module.

In some examples, the front-end module further includes a power amplifier module connected in the transmit path between the transmit contact and the first transmit filter, the method further comprising supplying, by the power amplifier, a differential transmit output on the first and second differential signal lines connected to the input of the first transmit filter. In at least one example, the power amplifier module includes a first power amplifier stage and a differential power amplifier stage, and wherein the front end-module further includes a second transmit filter connected in the transmit path between the first power amplifier stage and the differential power amplifier stage, the method further comprising converting, by the second transmit filter, a single-ended output from the first power amplifier stage into a differential input to the differential power amplifier stage. In various examples, the method includes supplying, by the differential power amplifier stage, the differential transmit output on the first and second differential signal lines.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 3C is a block diagram of another example of a front-end module according to aspects of the present invention.

DETAILED DESCRIPTION

Figure 1A:
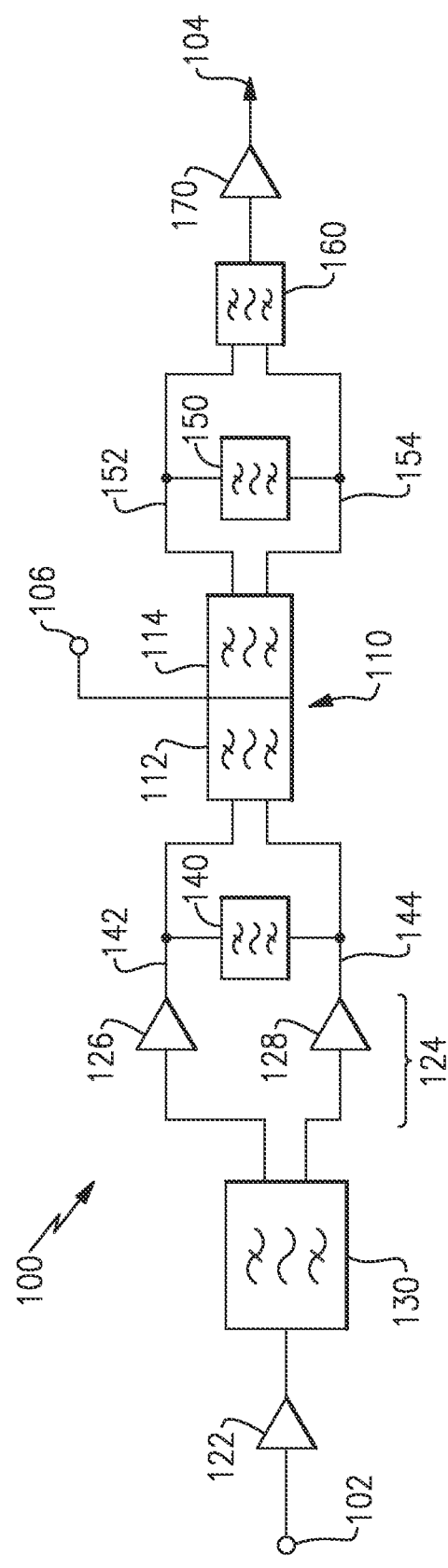
FIG. 1A is block diagram of one example of a front-end module according to aspects of the present invention.

Reducing in-band interference in transceivers or radio frequency (RF) front-end modules of communications devices is highly desirable; however, achieving an acceptable solution can be difficult. Conventional methods for coupling-off known interference sources and conditioning the amplitude and phase of signals to perfectly cancel dynamically are complicated, prone to instability issues, poorly suited to cancel interference at or below fundamental thermal noise limits, consume DC power, and require significant computation capability along with an often unattractive amount of information from the baseband module about the original signals. Many of these drawbacks are difficult to manage in an autonomous front-end module without a significant amount of software and interaction with the baseband module. In addition, the complexity and high isolation requirements add cost to front-end modules and worsen performance, for example, by increasing the insertion loss.

Aspects and embodiments provide a solution for reducing in-band interference by leveraging differential components present in the front-end module to implement noise/interference/leakage cancellation techniques. For example, as discussed further below, certain embodiments leverage the differential transmit power amplifier engine that is used in many front-end modules for higher performance to implement cancellation techniques. In addition, many front-end modules include surface acoustic wave (SAW) filters for a variety filtering purposes, and further embodiments leverage the capability of SAW filter technology for differential to single-ended conversion to implement cancellation techniques.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single one, more than one, and all of the described terms. As used herein the term "noise" is intended to refer to all undesired signals present along with a signal of interest, including, but not limited to, leakage or interference from other transmit channels or nearby transmitting devices, thermal and electronic noise, harmonics, self-generated carrier signals, spurious emissions, transmitter ACLR, transmitter leakage into the receive path, and the like.

Referring to FIG. 1A, there is illustrated a block diagram of one example of a front-end module 100 implementing noise cancellation according to certain embodiments. The front-end module 100 includes a transmit contact 102, a receive contact 104, and an antenna contact 106. A filtering duplexer 110 is connected to the antenna contact 106. The duplexer 100 includes a first transmit filter 112 connected in the transmit path between the transmit contact 102 and the antenna contact 106, and a first receive filter 114 connected in the receive path between the antenna contact 106 and the receive contact 104. The first transmit filter 112 and the first receive filter 114 in the duplexer 110 are bandpass filters, each tuned to the range of frequencies corresponding to the transmit and receive bands, respectively, of the wireless device in which the front-end module is to be used. As discussed further below, in operation of the wireless device, a transmit signal is received at the transmit contact, optionally amplified and filtered, and provided via the duplexer 110 to the antenna contact 106 for transmission by an antenna connected to the antenna contact 106. A receive signal received by the antenna is passed from the antenna contact 106 into the receive path where it is filtered and optionally amplified and then supplied to the receive contact 104 for processing by downstream electronics.

In the example shown in FIG. 1A, the front-end module 100 is configured with a push-pull power amplifier, including a first power amplifier stage 122 and a differential power amplifier stage 124, in the transmit path. The differential power amplifier stage 124 includes a pair of differential power amplifiers 126, 128, as shown. The front-end module 100 further includes a second transmit filter 130 that is a bandpass filter tuned to pass the transmit frequency band(s). In the example of FIG. 1A, the second transmit filter 130 is positioned between the first power amplifier stage 122 and the differential power amplifier stage 124; however, other configurations may be implemented as discussed further below.

As discussed above, although the first transmit filter 112 in the duplexer and the second transmit filter 130 may be well designed, it can nonetheless be difficult to sufficiently filter out various interfering signals and noise, including transmitter leakage from other channels or nearby devices, for example. According to certain aspects and embodiments, a noise cancellation technique includes placing a frequency-specific "short" between the two differential traces/signal lines. In the example shown in FIG. 1A, a first bandpass filter 140 is connected between the two differential lines 142, 144. One differential line carries a positive signal and the other a negative signal. The first bandpass filter 140 has a passband corresponding to the range of frequencies to be canceled or removed from the transmit signal supplied to the duplexer 110. Accordingly, the first bandpass filter 140 may act as a "short" across the differential lines 142, 144 to frequencies in its passband, causing the noise in that frequency range to be the same on both lines 142, 144. This low impedance path between the differential lines 142, 144 is enhanced in its effective shorting of the undesired receive passband frequencies because of the much higher relative impedance looking into the differential input of filter 112 at the frequencies of the undesired signals intended to be cancelled. The two differential lines 142, 144 form a differential input to the first transmit filter 112 of the duplexer 110, which has a certain level of common mode rejection. Because the first bandpass filter 140 causes the noise in its passband to be "shorted" between the two differential lines 142, 144, and therefore "common" to both inputs of the first transmit filter 112, the common mode rejection properties of the first transmit filter 112 filters out or cancels the noise. Accordingly, this common mode rejection may provide noise cancellation that allows relaxation of the requirements for the other in-band filtering (e.g., provided by the first and second transmit filters 112, 130) and acts in combination with the first and second transmit filters 112, 130 to improve performance of the front-end module 100.

Thus, the first bandpass filter 140 may be used in combination with the duplexer 110 to provide noise filtering in the transmit path of the front-end module 100. Similarly, a second bandpass filter 150 can be used in the receive path to cancel out or reduce receive-band noise and ACLR leakage from the transmitter, for example. According to certain embodiments, the first receive filter 114 in the duplexer 110 can be configured to provide a differential output on differential lines 152, 154. The second bandpass filter 150 is connected between the differential lines 152, 154 to provide a frequency-specific "short" between the two lines, similarly as discussed above on the transmit side. Specifically, the second bandpass filter 150 can be configured with a passband that passes frequencies corresponding to known sources of noise or at least a portion of the transmit frequency band(s), for example. The second bandpass filter 150 thus causes signals at those frequencies to be the same on both differential lines 152, 154, as discussed above. The differential lines 152, 154 form the input to a second receive filter 160, and the common mode rejection property of the second receive filter 160 cancels or reduces the noise that has been equalized on the two differential lines 152, 154 by the second bandpass filter 150.

The output from the second receive filter 160, which may include the desired receive signal from the antenna contact 106 and a significantly reduced level of noise due to the combined filtering of the first receive filter 114, the second bandpass filter 150, and the second receive filter 160, may be amplified by a low noise amplifier module 170 before being output at the receive contact 104 for processing by downstream electronics.

Figure 1B:
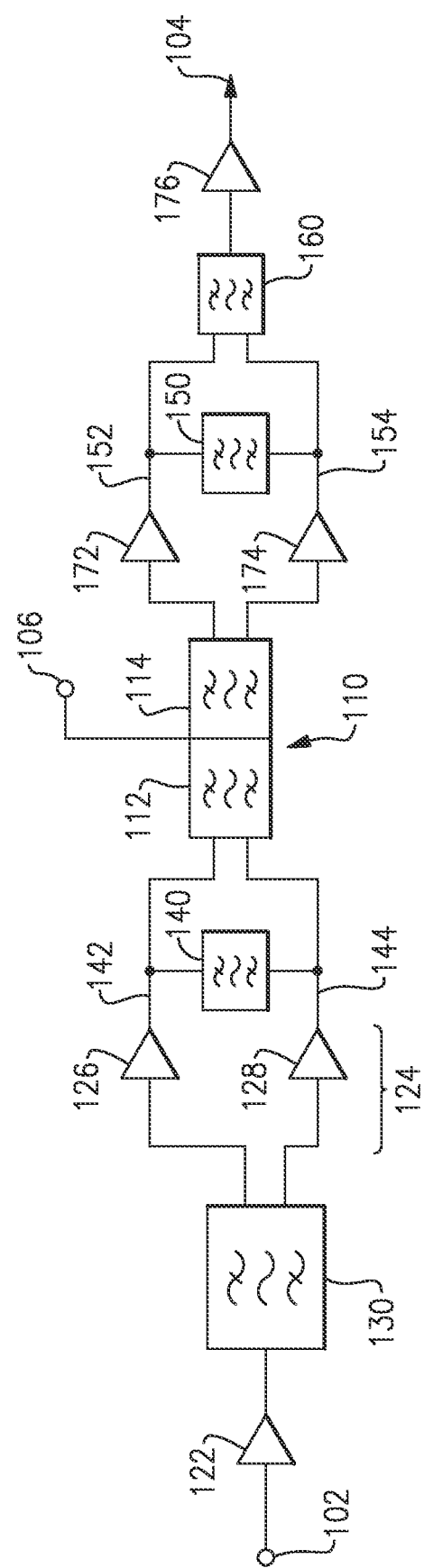
FIG. 1B is a block diagram of another example of a front-end module according to aspects of the present invention.

In the example shown in FIG. 1A, the power amplifier module has a single-ended input with differential outputs, including the first (single-ended) power amplifier stage 122 and the differential power amplifier stage 124, as discussed above. In certain examples, the low noise amplifier module 170 can include differential inputs and a single-end output, as shown, for example, in FIG. 1B. Referring to FIG. 1B, in this example, the low noise amplifier module includes a pair of differential low noise amplifiers 172, 174 connected to the two differential lines 152, 154, respectively, and an additional low noise amplifier 176. The second receive filter 160 may convert the differential outputs from the pair of differential low noise amplifiers 172, 174 into a single-ended output that is applied to the single-ended additional low noise amplifier 176 as shown.

As discussed above, various filters in the front-end module 100 may be configured to provide single-ended to differential input/output conversion (or vice versa). For example, the first transmit filter 112 in the duplexer 110 may be configured to receive a differential input from the differential power amplifier stage 124 and provide a single-ended output to the antenna contact 106, and the first receive filter 114 may be configured to receive a single-ended input from the antenna contact 106 and provide a differential output to the second receive filter 160, as shown in FIG. 1A. As discussed above, the second receive filter 160 may receive the differential input on lines 152, 154 and provide a single-ended output to the low noise amplifier module 170 (in the example of FIG. 1A) or to the additional low noise amplifier 176 in the example of FIG. 1B. Further, in the examples shown in FIGS. 1A and 1B, the second transmit filter 130 is located between the single-ended first power amplifier stage 122 and the differential power amplifier stage 124, and may provide single-ended input to differential output conversion. For example, the second transmit filter may convert the single output from the first power amplifier stage 122 into a differential signal that can be applied to the two differential power amplifiers 126, 128 of the differential power amplifier stage 124. In certain examples, any of these filters may be implemented using surface acoustic wave (SAW) devices, and therefore, advantageously, may naturally have the ability to provide single-ended to differential conversion (and vice versa). Accordingly, aspects and embodiments may leverage the capability of filtering components used in the front-end module to set up an architecture in which the above-discussed noise cancellation techniques may be used. In certain examples, the front-end module can advantageously use multiple types of acoustic wave devices. For example, the bandpass filters 140 and/or 150 may be implemented using bulk acoustic wave (BAW) devices or film bulk acoustic resonator (FBAR) devices, whereas those filters that may provide single-ended to differential conversion (or vice versa), such as the first transmit filter 112, the first receive filter 114, the second transmit filter 130, and/or the second receive filter 160 may be implemented using SAW devices.

Figure 2:
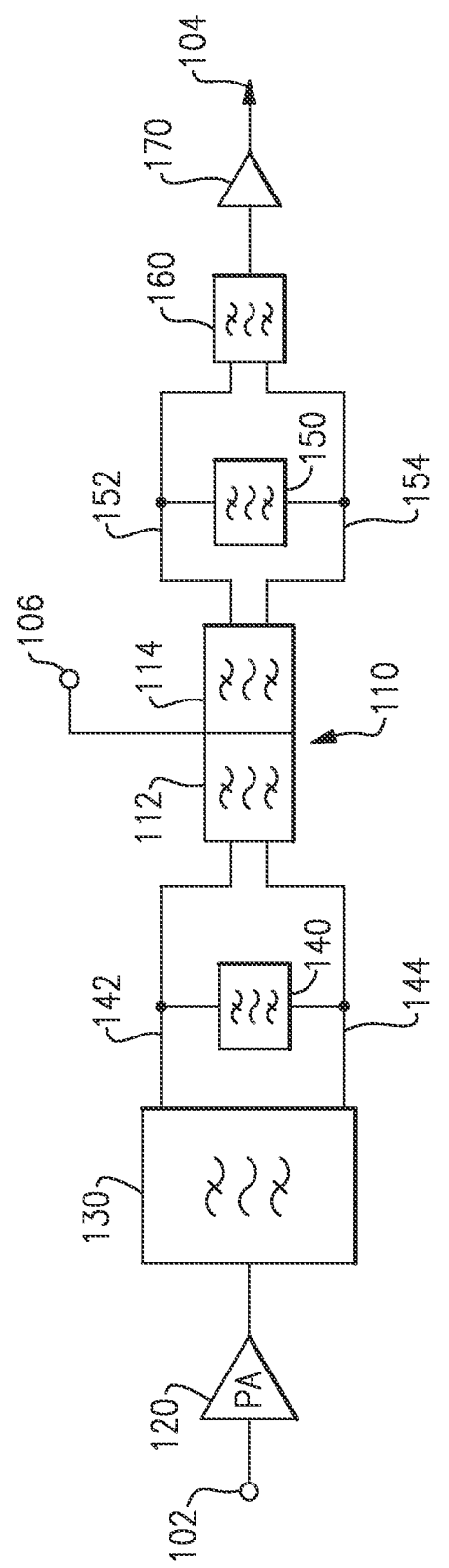
FIG. 2 is a block diagram of another example of a front-end module according to aspects of the present invention.

In certain examples SAW filter components in the second transmit filter 130 can be used to produce the differential lines 142, 144 without the need for a differential power amplifier stage 124. For example, referring to FIG. 2, in the case of a single-ended power amplifier module 120, the second transmit filter 130 may be used to produce the differential lines 142, 144 that are "shorted" together in a specific band of frequencies by the first bandpass filter 140. The differential output (on lines 142, 144) from the second transmit filter 130 is then driven into a differential input filter (namely, the first transmit filter 112 in the example shown in FIG. 2) that provides common mode rejection and cancellation of undesired noise in the frequency band corresponding to the passband of the first bandpass filter 140, as discussed above. In certain example, the second transmit filter 130 may be implemented using SAW devices to provide the single-ended input to differential output conversion.

As discussed above, in certain embodiments, the power amplifier module 120 includes differential amplification, such as a push-pull configuration, for example. In such cases, the differential output provided to the first transmit filter 112 may be produced in various different ways. In the example shown in FIG. 1, the second transmit filter 130 is positioned between the single-ended first power amplifier stage 122 and the differential power amplifier stage 124, and can be configured to produce a differential output that is provided to the differential power amplifier stage 124. For example, as discussed above, the second transmit filter 130 can be a SAW filter that is configured to provide the single-ended input to differential output conversion. In other examples, the power amplifier module itself can be configured to provide the single-ended input to differential output conversion, and the second transmit filter 130 may be moved earlier in the transmit path. Examples of such configurations are shown in FIGS. 3A-3C.

Figure 3A:
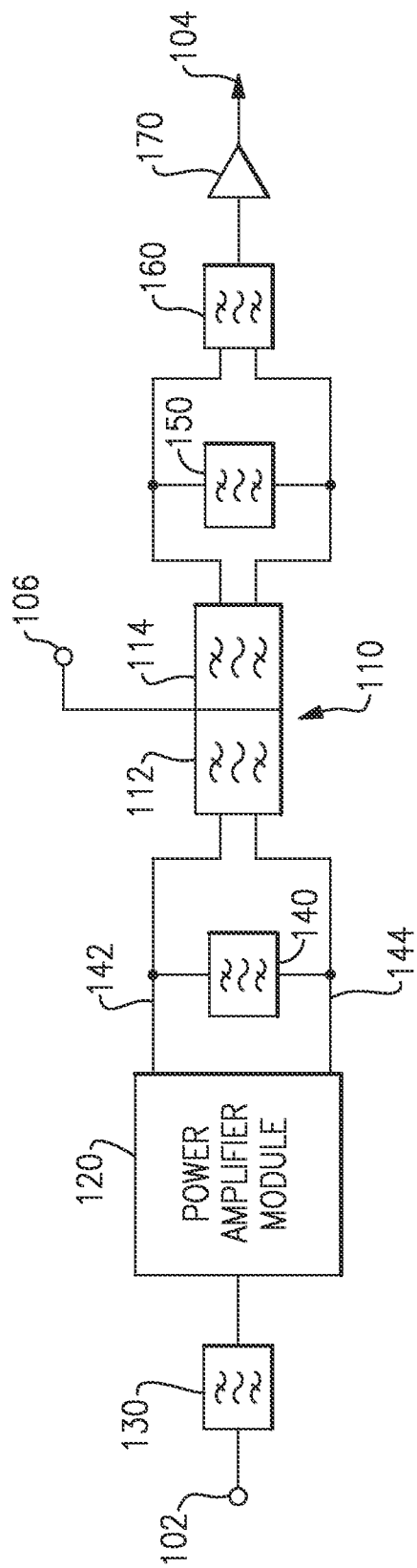
FIG. 3A is a block diagram of another example of a front-end module according to aspects of the present invention.

Referring to FIG. 3A, in this example, the second transmit filter 130 is connected between the transmit contact 102 and the power amplifier module 120. The power amplifier module may include a balun or other structure configured to perform the single-ended input to differential output conversion needed to supply a differential input to the first transmit filter 112 and allow for noise cancellation via frequency-specific shorting across the differential lines 142, 144 and common mode rejection as discussed above. Moving the second transmit filter 130 to earlier in the transmit path may provide further benefits to effect significant filtering of noise, particularly noise falling in the receiver frequency band(s), such as transceiver noise and transmitter ACLR contributions that otherwise would be amplified by the power amplifier module 120. Similarly, the configuration of FIGS. 1A and 1B, where the second transmit filter 130 is positioned between the first power amplifier stage 122 and the differential power amplifier stage 124, may also provide benefits in that the second transmit filter 130 may provide significant filtering of noise produced by transmitter components and the first power amplifier stage 122 that would otherwise have been directly amplified by the differential power amplifier stage 124.

Figure 3B:
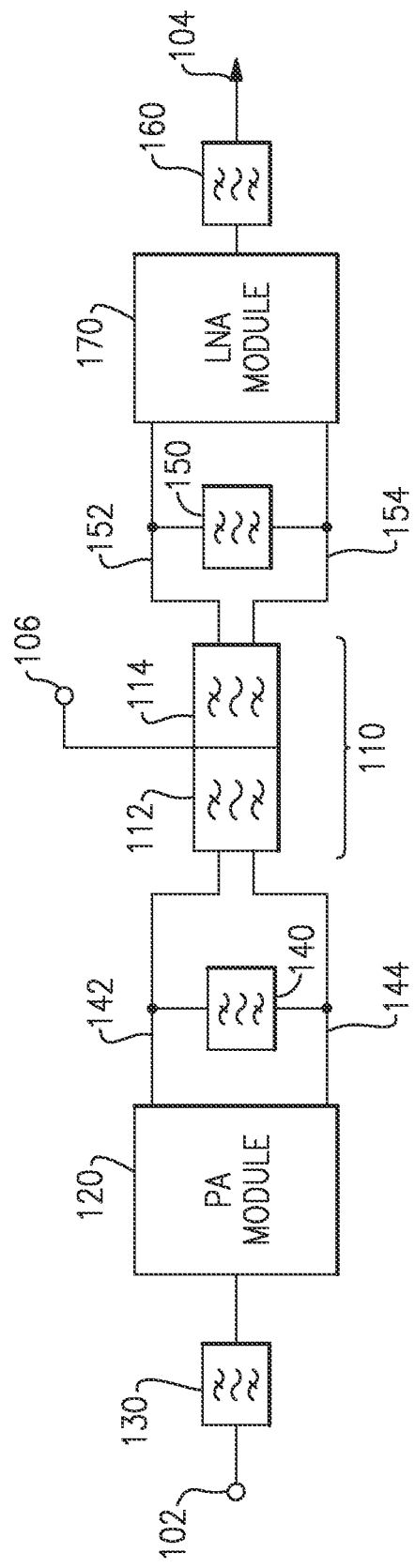
FIG. 3B is a block diagram one another example of a front-end module according to aspects of the present invention.

Referring to FIG. 3B, as discussed above, in certain examples, the low noise amplifier module 170 may perform the differential input to single-ended output conversion needed to receive the differential outputs on the differential lines 152, 154 and supply a single-ended output at the receive contact 104. The second receive filter 160 may provide additional filtering of the output signal, as discussed above. In the examples of FIGS. 3A and 3B, where the power amplifier module 120 and the low noise amplifier module 170 may provide single-ended to differential conversion, and vice versa, one or both of the second transmit filter 130 and the second receive filter 160 may be omitted. FIG. 3C illustrates an example in which both the second transmit filter 130 and the second receive filter 160 are omitted. The second transmit filter 130 and/or the second receive filter 160 may be omitted or included based on various design considerations, including, for example, the level of noise rejection (filtering) required and/or insertion loss in the transmit path and/or receive path.

Thus, aspects and embodiments provide a noise cancellation approach that is based on leveraging the cancellation achieved by shorting together two differential signal lines, at certain frequencies, and feeding those differential signal lines into a differential filter with common mode rejection behavior. The noise cancellation technique can be applied in the transmit path, for example, to increase or improve filtering out of receiver-band noise produced by transmitter leakage and component noise as well as interference on the transmit signal caused by leakage from other transmit channels or nearby transmitting devices. Similarly, the noise cancellation technique can be applied in the receive path to increase or improve filtering out of receiver-band noise from the transmit path or other nearby devices. Using the noise cancellation technique disclosed herein may allow relaxation of the filtering requirements on other filter components in the front-end module 100, making production of such components easier or less expensive, and improve the overall performance of the front-end module 100. Embodiments of the noise cancellation approach may be passive, based on the addition of the first and/or second bandpass filters 140, 150 and leveraging of the common mode rejection properties of other filters used in the front-end module 100. Noise cancellation thus may be provided at lower loss and complexity, and without active electrical or calibration interactions. In certain examples, the front-end module 100 can be configured to allow for dynamic adjustment of the noise cancellation by providing tuning of the passband(s) of the first and/or second bandpass filter(s) 140, 150, for example, under control of a processor included in the baseband module of the wireless device in which the front-end module 100 is used.

The examples shown in FIGS. 1A-3C illustrate multiple filter components or filtering stages as discrete "blocks." Those skilled in the art will appreciate, given the benefit of this disclosure, however, that any or all of the filters shown in the various examples may be made up of many stages and/or combined or share components in different physical implementations. Accordingly, the examples shown in FIGS. 1A-3C are intended to be functional illustrations and not limiting in any aspect with respect to actual implementations of the front-end module 100. Aspects and embodiments provide a noise cancellation approach that can be designed into the overall front-end module 100 configuration such that the overall filter out-of-band attenuations required can be relaxed, requirements on some or all the filter sections may be relaxed to provide more optimal and lower insertion losses, and the net insertion loss and out-of-band attenuation/isolation properties of the entire front-end module 100 may exhibit less loss, more isolation, and more out-of-band attenuation where desired.

Figure 4:
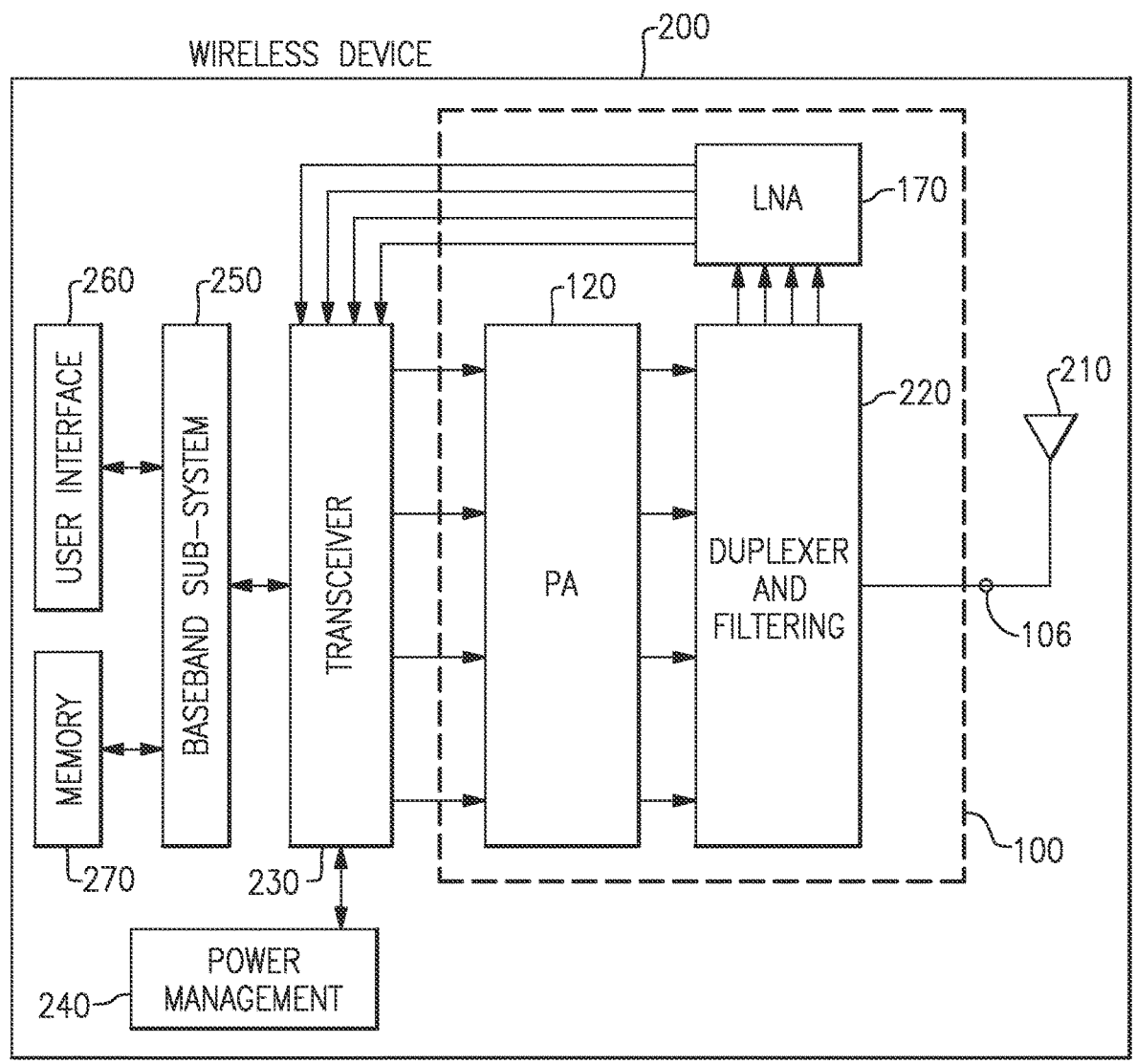
FIG. 4 is a block diagram of one example of a wireless device including a front-end module according to aspects of the present invention.

As discussed above, embodiments of the front-end module may be used in a wireless device. FIG. 4 is a block diagram of one example of a wireless device 200 including an example of the front-end module 100. The wireless device 200 can be a cellular phone, smart phone, tablet, modem, or any other portable or non-portable device configured for voice or data communications. The wireless device 200 includes an antenna 210 coupled to the antenna contact 106 of the front-end module 100. The wireless device 200 can transmit and receive signals from the antenna 210. As discussed above, the front-end module 100 includes a power amplifier module 120 in the transmit path and a low noise amplifier module 170 in the receive path. The front-end module 100 further includes a duplexer and filtering module 220 that may include the duplexer 110 and the various transmit, receive, and noise-cancellation filters (e.g., the second transmit filter 130, the first bandpass filter 140, the second bandpass filter 150, and the second receive filter 160) discussed above. The front-end module 100 may have any of the configurations discussed above with reference to FIGS. 1A-3C.

Referring to FIG. 4, the wireless device 200 includes a transceiver 230, which may incorporate transmitter circuitry and receiver circuitry. The transceiver 230 is configured to generate signals for transmission and/or to process received signals. Signals generated for transmission are received by the power amplifier module 120, which amplifies the generated signals from the transceiver 230. Received signals are amplified by the low noise amplifier (LNA) module 170 and then provided to the transceiver 230. The duplexer and filtering module 220 can be configured to switch between different bands and/or modes, transmit and receive modes etc. In certain examples, the antenna 210 both receives signals that are provided to the transceiver 230 via the duplexer and filtering module 220 and the LNA module 170 and also transmits signals from the wireless device 200 via the transceiver 230, the power amplifier module 120, and the duplexer and filtering module 220. However, in other examples multiple antennas can be used.

The power amplifier module 120 can be used to amplify a wide variety of RF or other frequency-band transmission signals. For example, the power amplifier module 120 can receive an enable signal that can be used to pulse the output of the power amplifier to aid in transmitting a wireless local area network (WLAN) signal or any other suitable pulsed signal. The power amplifier module 120 can be configured to amplify any of a variety of types of signal, including, for example, a Global System for Mobile (GSM) signal, a code division multiple access (CDMA) signal, a W-CDMA signal, a Long Term Evolution (LTE) signal, or an EDGE signal. In certain embodiments, the power amplifier module 120 and associated components including switches and the like can be fabricated on GaAs substrates using, for example, pHEMT or BiFET transistors, or on a Silicon substrate using CMOS transistors.

The wireless device 200 further includes a power management system 240 that is connected to the transceiver 230 and that manages the power for the operation of the wireless device 200. The power management system 240 can also control the operation of baseband processing circuitry 250 and other components of the wireless device 200. The power management system 240 provides power to the various components of the wireless device 200. Accordingly, in certain examples the power management system 240 may include a battery. Alternatively, the power management system 240 may be coupled to a battery (not shown).

In certain embodiments the baseband sub-system 250 is connected to a user interface 260 to facilitate various input and output of voice and/or data provided to and received from the user. The baseband sub-system 250 can also be connected to a memory 270 that is configured to store data and/or instructions to facilitate the operation of the wireless device 200, and/or to provide storage of information for the user.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A front-end module comprising:
   a transmit contact, a receive contact, and an antenna contact;
   a duplexer including a first transmit filter connected in a transmit path between the transmit contact and the antenna contact, and a first receive filter connected in a receive path between the antenna contact and the receive contact, the first transmit filter having a differential input and the first receive filter having a differential output;
   first and second differential signal lines connected to one of the differential input of the first transmit filter or the differential output of the first receive filter, and configured to provide a first differential transmit signal to the differential input of the first transmit filter or provide a first differential receive signal from the differential output of the first receive filter; and
   a first bandpass filter connected between the first and second differential signal lines and configured to provide a first frequency-specific short between the first and second differential signal lines.

2. The front-end module of claim 1 wherein the first bandpass filter has a passband overlapping in frequency with a passband of at least one of the first receive filter and the first transmit filter.

3. The front-end module of claim 2 further comprising a second transmit filter coupled between the transmit contact and the first and second differential signal lines.

4. The front-end module of claim 3 wherein the second transmit filter is a surface acoustic wave filter.

5. The front-end module of claim 2 further comprising a second receive filter coupled between the receive contact and the first and second differential signal lines.

6. The front-end module of claim 5 wherein the second receive filter is a surface acoustic wave filter.

7. The front-end module of claim 1 wherein the first and second differential signal lines are connected between the transmit contact and the first transmit filter, the front-end module further comprising third and fourth differential signal lines connected between the first receive filter and the receive contact, and a second bandpass filter connected between the third and fourth differential signal lines and configured to provide a second frequency-specific short between the third and fourth differential signal lines.

8. The front-end module of claim 7 wherein the second bandpass filter has a passband overlapping in frequency with a passband of the first transmit filter.

9. The front-end module of claim 8 further comprising a low noise amplifier module connected in the receive path between a second receive filter and the receive contact.

10. The front-end module of claim 9 wherein the second receive filter is configured to convert the differential output to a single-ended input into the low noise amplifier module.

11. The front-end module of claim 10 wherein the second receive filter is a surface acoustic wave filter.

12. The front-end module of claim 7 further comprising a power amplifier module connected in the transmit path between the transmit contact and the first transmit filter, the power amplifier module being configured to supply a differential transmit output on the first and second differential signal lines connected to the differential input of the first transmit filter.

13. The front-end module of claim 12 wherein at least one of the first bandpass filter and the second bandpass filter includes at least one bulk acoustic wave device or at least one film bulk acoustic resonator device.

14. The front-end module of claim 12 wherein the power amplifier includes a first power amplifier stage and a differential power amplifier stage, the front end-module further comprising a second transmit filter connected in the transmit path between the first power amplifier stage and the differential power amplifier stage, the second transmit filter being configured to convert a single-ended output from the first power amplifier stage into a differential input to the differential power amplifier stage, the differential power amplifier stage being configured to supply the differential transmit output on the first and second differential signal lines.

15. A method of operating a front-end module including a transmit contact, an antenna contact, a receive contact, a duplexer including a first transmit filter connected in a transmit path between the transmit contact and the antenna contact and a first receive filter connected in a receive path between the antenna contact and the receive contact, first and second differential signal lines connected to one of an input of the first transmit filter or an output of the first receive filter, and a first bandpass filter connected between the first and second differential signal lines, the method comprising:
   receiving, at the transmit contact, a transmit signal;
   providing, at the receive contact, a receive signal;
   communicating, by the first and second differential signal lines, the transmit signal from the transmit contact to the first transmit filter or the receive signal from the first receive filter to the first receive contact; and providing, by the first bandpass filter, a first frequency-specific short between the first and second differential signal lines to one of the transmit signal and the receive signal.

16. The method of claim 15 wherein the front-end module further includes third and fourth differential signal lines coupled to the output of the first receive filter and a second bandpass filter connected between the third and fourth differential signal lines, the method further comprising providing, by the second bandpass filter, a second frequency-specific short between the third and fourth differential signal lines to the receive signal.

17. The method of claim 16 wherein the front-end module further includes a second receive filter coupled between the receive contact and the third and fourth differential signal lines and a low noise amplifier module connected in the receive path between the second receive filter and the receive contact, the method further comprising converting, by the second receive filter, the output of the first receive filter to a single-ended input into the low noise amplifier module.

18. The method of claim 15 wherein the front-end module further includes a power amplifier module connected in the transmit path between the transmit contact and the first transmit filter, the method further comprising supplying, by the power amplifier, a differential transmit output on the first and second differential signal lines connected to the input of the first transmit filter.

19. The method of claim 18 wherein the power amplifier module includes a first power amplifier stage and a differential power amplifier stage, and wherein the front end-module further includes a second transmit filter connected in the transmit path between the first power amplifier stage and the differential power amplifier stage, the method further comprising converting, by the second transmit filter, a single-ended output from the first power amplifier stage into a differential input to the differential power amplifier stage.

20. The method of claim 19 further comprising supplying, by the differential power amplifier stage, the differential transmit output on the first and second differential signal lines.

* * * * *